(12) United States Patent  
Pieraccini

(10) Patent No.: US 10,768,296 B2  
(45) Date of Patent: Sep. 8, 2020

(54) INTERFEROMETRIC RADAR WITH ROTATING ANTENNA

(71) Applicant: UNIVERSITA' DEGLI STUDI DI FIRENZE, Florence (IT)

(72) Inventor: Massimiliano Pieraccini, Florence (IT)

(73) Assignee: UNIVERSITA' DEGLI STUDI DI FIRENZE, Florence (IT)

(*) Notice: Subject to any disclaimer, the term of this patent is extended or adjusted under 35 U.S.C. 154(b) by 244 days.

(21) Appl. No.: 15/747,930

(22) PCT Filed: Jul. 26, 2016

(86) PCT No.: PCT/IB2016/001052  
§ 371 (c)(1),  
(2) Date: Jan. 26, 2018

(87) PCT Pub. No.: WO2017/017518  
PCT Pub. Date: Feb. 2, 2017

(65) Prior Publication Data  
US 2018/0217253 A1 Aug. 2, 2018

(30) Foreign Application Priority Data  
Jul. 27, 2015 (IT) .................. 102015000038482

(51) Int. Cl.  
*G01S 13/90* (2006.01)  
*G01S 7/02* (2006.01)

(52) U.S. Cl.  
CPC .......... *G01S 13/9023* (2013.01); *G01S 7/025* (2013.01); *G01S 13/9088* (2019.05)

(58) Field of Classification Search  
CPC .. G01S 13/9023; G01S 13/9088; G01S 7/025; G01S 7/292; G01S 7/487;  
(Continued)

(56) References Cited

U.S. PATENT DOCUMENTS

| | | | | |
|---|---|---|---|---|
| 4,723,124 A | * | 2/1988 | Boles | .................. G01S 13/9023 342/25 C |
| 5,379,041 A | | 1/1995 | Klausing | |
| 2010/0265117 A1 | * | 10/2010 | Weiss | .................... G01S 13/003 342/22 |

FOREIGN PATENT DOCUMENTS

| | | |
|---|---|---|
| EP | 1 145 038 B1 | 5/2003 |
| EP | 2 194 400 A1 | 6/2010 |
| EP | 2194400 A1 * | 6/2010 ............. G01S 13/04 |

OTHER PUBLICATIONS

A review of ground-based SAR interferometry for deformation measurement, O. Monserrat, 2014, ISPRS Journal of Photgrammetry and Remote Sensing. (Year: 2014).*

(Continued)

*Primary Examiner* — Vladimir Magloire  
*Assistant Examiner* — Michael W Justice  
(74) *Attorney, Agent, or Firm* — McGlew and Tuttle, P.C.

(57) ABSTRACT

An interferometric radar comprising an arm (2), which rotates with respect to an axis (z) of a plane (zx) orthogonal to an axis of rotation (y), a system of linear-polarization antennas (1), which is fixed to said arm (2) for describing complete revolutions along a circular path (c) about said axis (y) and is oriented in a direction of sight (a) parallel to the axis (y), motor-drive means (3) for driving the arm (2), a data-acquisition and processing unit (10) operatively connected to said antenna (1) for acquiring a succession of images detected by the antenna during its revolution about the axis (y) and making differential interferometric calculations for measuring at least one component of the displacement of one or more targets in the field of view, or else for measuring the digital elevation map (DEM) of the scenario in the field of view.

18 Claims, 2 Drawing Sheets

(58) Field of Classification Search
CPC ...... G01S 7/52004; G01S 7/526; G01S 7/536;
G01S 7/354; G01S 7/4021; G01S 7/493;
G01S 7/497; G01S 15/32; G01S 15/34;
G01S 13/34; G01S 13/103
See application file for complete search history.

(56) References Cited

OTHER PUBLICATIONS

Double Circular Scanning in Microwave Holography; N. H. Farhat, Proceedins of IEEE, Apr. 1973. (Year: 1973).*
M. Pieraccini, D. Tarchi, H. Rudolf, D. Leva, G. Luzi, C. Atzeni, Interferometric radar for remote monitoring of building deformations, Electronics Letters, vol. 36, No. 6, pp. 569-570 (2000).
O. Monserrat et al., A review of ground-based SAR interferometry for deformation measurement, ISPRS Journal of Photogrammetry and Remote Sensing, vol. 93, Jul. 1, 2014, pp. 40-48.

* cited by examiner

INTERFEROMETRIC RADAR WITH ROTATING ANTENNA

The invention relates to an interferometric radar and in particular an interferometric radar with rotating antenna with a direction of sight orthogonal to the plane of rotation.

PRIOR ART

Interferometric radars referred to as GB-SARs (Ground-Based Synthetic-Aperture Radars) devised in particular for monitoring structures of large dimensions such as hillsides, open-cast mines, large architectural structures, such as towers and bridges have been known for some time. GB-SAR technology is of particular interest because it constitutes a radar technique capable of providing high-precision displacement maps over an entire range of observation. In their basic conformation, conventional GB-SARs are obtained by moving an antenna along an axis, as described in the paper by M. Pieraccini, D. Tarchi, H. Rudolf, D. Leva, G. Luzi, C. Atzeni, *Interferometric radar for remote monitoring of building deformations*, Electronics Letters, Vol. 36, No. 6, pp. 569-570 (2000). The U.S. Pat. No. 5,379,041 describes a SAR that makes use of an antenna fixed on a rotating arm and oriented in a radial direction, which enables creation of 360-degree images. The system described is, however, of a non-interferometric type, and the image forms in a plane parallel to the plane of rotation instead of in a plane orthogonal thereto. The patent No. EP1145038 describes a rotating-antenna interferometric synthetic-aperture radar, designed for measuring angles, which requires at least two coherent receiving antennas and in which the image forms in a plane parallel to the plane of rotation.

The patent No. EP2194400 describes a non-interferometric radar constituted by an antenna mounted on the sail of a windmill, which hence turns in the vertical plane and supplies an image in the space in front of the plane of rotation.

In this system, SAR synthesis occurs using the entire circumference, providing azimuth and elevation information, but with marked secondary lobes due to sampling on a closed line, and can hence be used for surveillance purposes, i.e., for detection of pointlike objects (aeroplanes or ships), but is not suitable for measuring small displacements for monitoring hillsides or buildings.

The known solutions present some significant drawbacks in the context of the systems for measuring displacements, in particular because they are able to detect only the radial component and are unable to provide with a single acquisition displacement maps and elevation maps (the so-called "digital elevation maps"—DEMs) of the field of view.

Moreover, rotating-antenna SARs of a type known in the literature supply images with marked secondary lobes, whereas linear SARs can provide images without marked secondary lobes, but are slow.

PURPOSE OF THE INVENTION

The purpose of the present invention is hence to propose an interferometric radar equipped with rotating antenna with a direction of sight orthogonal to the plane of rotation that will be free from the aforementioned drawbacks of the systems of a known type.

SUMMARY OF THE INVENTION

The above and further purposes are achieved with an interferometric radar according to one or more of the annexed claims.

A first advantage of the invention lies in the fact that the interferometric radar proposed is able to measure the displacement vector and not only the component in the direction of sight.

A second advantage lies in the fact that the interferometric radar of the invention is able to obtain with a single acquisition: the map of the displacements in the three components and the digital elevation map (DEM) of the field of view.

A further advantage lies in the fact that the radar is fast as compared to solutions with linear geometry in so far as the antenna turns at a constant rate and does not have to stop and go back.

LIST OF THE DRAWINGS

The above and further advantages will be better understood by any person skilled in the branch from the ensuing description and from the annexed drawings, which are provided by way of non-limiting example and in which.

DETAILED DESCRIPTION

Figure 1:
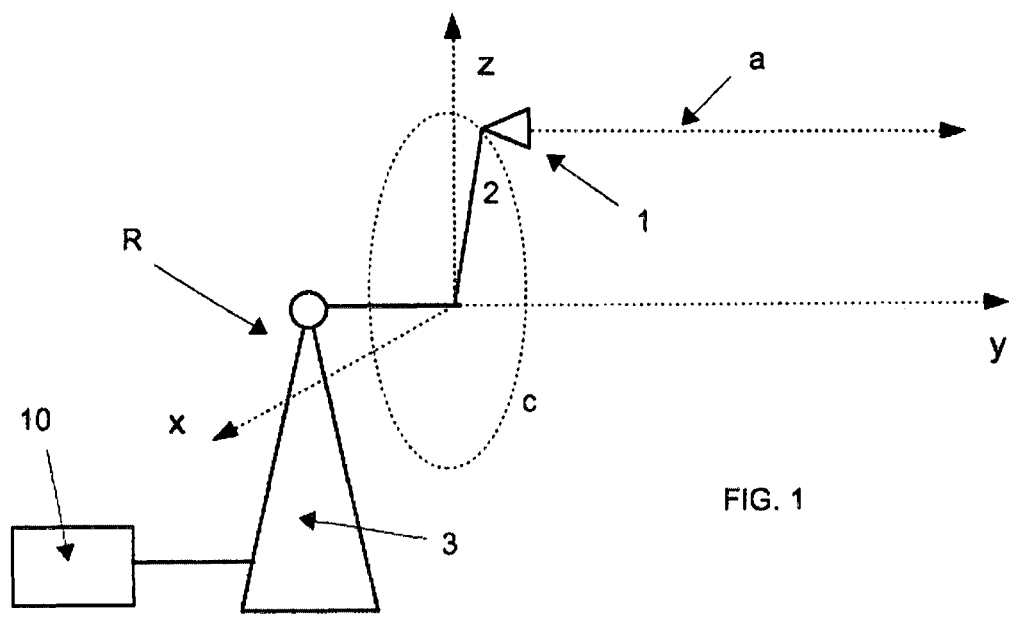
FIG. 1 is a schematic view of a rotating radar antenna according to the invention.

With reference to the attached drawings, a radar R according to the invention is described, which comprises a data-acquisition and processing unit 10, which receives the data detected by at least one antenna 1, which rotates in the plane zx orthogonal to the direction of sight y of the antenna and is fixed to an arm 2 that can be set in rotation by a motor-drive support 3.

In a first embodiment, the antenna 1 comprises a single linear-polarization antenna 1, but the antenna 1 may be equivalently constituted by two linear-polarization antennas (one for transmitting and one for receiving).

In a further embodiment, the antenna may comprise a single circular-polarization antenna or two circular-polarization antennas (one for transmitting and one for receiving). In addition, in an equivalent way, the circular-polarization antenna may be constituted by a system of polarimetric antennas.

In operation, the rotating element 2 is set in rotation, and a single image is obtained through an arc of rotation 4 (typically having an amplitude of 180° to maximize the aperture, but it could also have a different amplitude).

Figure 2:
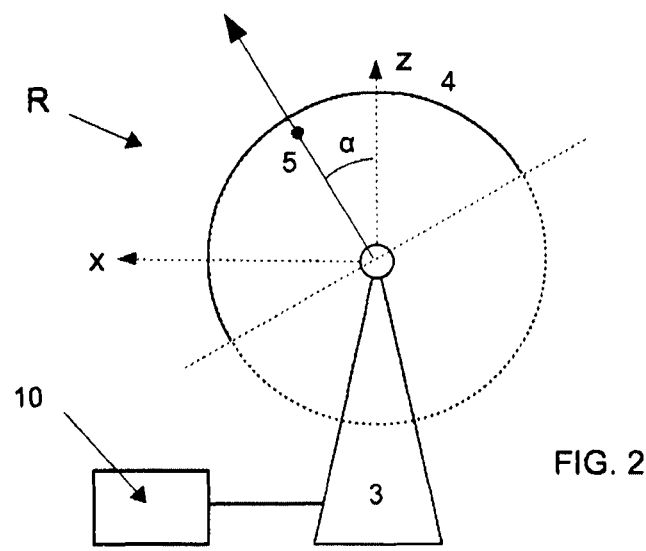
FIG. 2 is a cross-sectional view of the radar according to the invention.

Preferably, according to the invention, in order to obtain images without marked side lobes, the data of an arc 4 are windowed in cross-range with a window (for example, a Kaiser window) weighted on the segment subtended by the arc (for example, the diameter in the case of FIG. 2).

Figure 3:
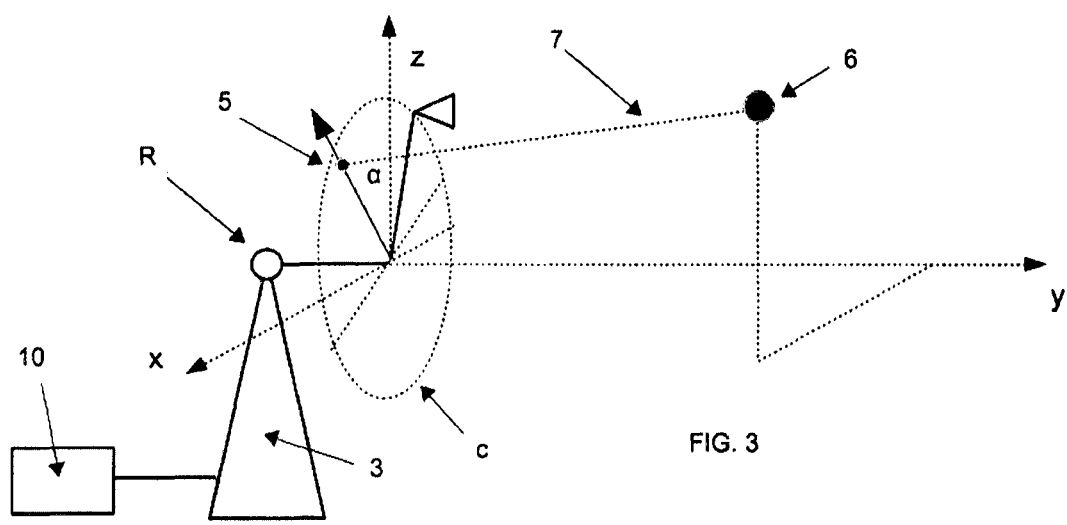
FIG. 3 is a schematic representation of the measurement geometry according to the invention.

With reference to FIG. 3, the phase centre 5 of the interferometric image falls on the bisectrix (axis of symmetry) of the arc 4. Given a target 6 in the field of view, the unit 10 of the radar R is able to measure the component of the displacement, in the direction 7, of the target 6/phase centre 5.

Thanks to this solution, by processing the data of three arcs with different angle α, understood as the angle formed by the axis z and by the bisectrix of the arc considered, and calculating the interferograms with the same angle α, the three maps of the three components of the displacement are obtained, whereas by processing the data of two arcs with different angle α and calculating the interferogram between the two images, the digital elevation map (DEM) of the field of view is obtained.

In a preferred example of embodiment of the invention, the arm 2 makes a complete rotation, during which the unit 10 of the radar R makes acquisitions at constant angular intervals, on arcs that are sufficiently small to prevent any angular ambiguities.

The data thus acquired can be processed for creating an image, which is constituted by the SAR synthesis of the data acquired on an arc 4 having an appropriate amplitude. This arc can have an axis in any direction, and the phase centre 5 of the image thus obtained falls on the bisectrix at a distance that, in the case where no windowing used, is approximately 64% of the radius; in the case where a Kaiser window with beta=5.48 is used, the phase centre is at a distance of approximately 89% of the radius. Considering two images (for example, the one obtained from the top semicircle and the one obtained from the bottom semicircle) two components of the displacement vector along the plane zy are obtained. With a third image (the points of which can overlap those of the other two) the third component is obtained. Moreover, by calculating the interferogram between the image obtained in the top semicircle and the image obtained in the bottom semicircle, the digital elevation map of the field of view is obtained.

In certain cases, it may be convenient to use fractions of arc smaller than a semicircle, in particular when the targets are complex objects that give rise to multiple reflections. The images obtained with smaller arcs in fact have a lower resolution, but also a smaller parallax due to the possible multiple reflections.

The present invention has been described according to preferred embodiments, but equivalent variants may be conceived, without thereby departing from the sphere of protection of the invention.

The invention claimed is:

1. An interferometric radar, comprising:
an arm, which rotates with respect to an axis of a plane orthogonal to an axis of rotation;
a system comprising a rotating antenna with a direction of sight orthogonal to said plane of rotation of said arm, said antenna being fixed to said arm for describing complete revolutions along a circular path about said axis of rotation and being oriented in a direction of sight parallel to said axis of rotation;
a motor-drive means for driving said arm; and
a data-acquisition and processing unit, operatively connected to said antenna, said data-acquisition and processing unit acquiring a succession of images detected by said antenna during revolution of said antenna about said axis of rotation and said data-acquisition and processing unit making differential interferometric calculations on at least two successive images of one or more targets located in a field of view of said system of one or more antennas in order to measure at least one component of displacement thereof, wherein said data-acquisition and processing unit processes said data detected along two distinct arcs of said circular path and said data-acquisition and processing unit calculates interferograms between said at least two successive images acquired from said two distinct arcs of said circular path to obtain two components of displacements of one or more targets.

2. The radar according to claim 1, wherein said data-acquisition and processing unit processes said data detected along three distinct arcs of said circular path and said data-acquisition and processing unit calculates said interferograms between successive images acquired from at least one of said arcs in order to obtain three components of said displacement in three directions of said target.

3. The radar according to claim 2, wherein said data-acquisition and processing unit processes said data of two arcs of said circular path with a different angle, equal to said angle formed by said axis and by a bisectrix of one of said arcs, and said data-acquisition and processing unit calculates said interferogram between said two images having said different angle in order to obtain a digital elevation map of said field of view.

4. The radar according to claim 1, wherein said data-acquisition and processing unit processes said data of two arcs of said circular path with a different angle, equal to said angle formed by said axis and by a bisectrix of said arc considered, and said data-acquisition and processing unit calculates said interferogram between said two images having said different angle in order to obtain a digital elevation map of said field of view.

5. The radar according to claim 1, wherein said data-acquisition and processing unit makes a windowing of said arcs weighted on a segment subtended by one of said arcs.

6. The radar according to claim 1, wherein said system comprises a linear-polarization antenna.

7. The radar according to claim 1, wherein said system comprises a circular-polarization antenna.

8. A method for monitoring displacements of one or more targets by means of an interferometric radar, the method comprising:
providing an arm, which rotates with respect to an axis of a plane orthogonal to an axis of rotation;
providing a system of linear-polarization antennas, which is fixed to said arm for describing complete revolutions along a circular path about said axis of rotation and said arm is oriented in a direction of sight parallel to said axis of rotation;
providing a motor-drive means for driving said arm; and
providing a data-acquisition and processing unit, which is operatively connected to said antenna and said data-acquisition and processing unit acquires a succession of images detected by said antenna during rotation of said antenna about said axis of rotation and said data-acquisition and processing unit makes differential interferometric calculations on at least two successive images of one or more targets located in a field of view of said system of one or more antennas in order to measure at least one component of displacement thereof, wherein said data-acquisition and processing unit processes said data detected along two distinct arcs of said circular path and said data-acquisition and processing unit calculates interferograms between said at least two successive images acquired from said two distinct arcs of said circular path in order to obtain two components of said displacement of one or more targets.

9. The method according to claim 8, wherein said data acquisition and processing unit processes said data detected along three distinct semicircles of said circular path and said data acquisition and processing unit calculates said interferograms corresponding to images acquired from at least one of said arcs in order to obtain three components of said displacement in three directions of one or more targets.

10. The method according to claim 9, wherein said data acquisition and processing unit processes said data of two arcs of said circular path with a different angle and said data acquisition and processing unit calculates said interferogram between said images obtained from said two arcs in order to obtain a digital elevation map of said field of view.

11. The method according to claim 10, wherein said data acquisition and processing unit makes a windowing of said arcs weighted on a segment subtended by one of said arcs.

12. The method according to claim 9, wherein said data acquisition and processing unit makes a windowing of said arcs weighted on a segment subtended by one of said arcs.

13. An interferometric radar, comprising:
an arm configured to rotate with respect to an axis of a plane orthogonal to an axis of rotation;
a system comprising a rotating antenna with a direction of sight orthogonal to said plane of rotation of said arm, said antenna being fixed to said arm for describing complete revolutions along a circular path about said axis of rotation and being oriented in a direction of sight parallel to said axis of rotation;
a motor-drive device configured to drive said arm; and
a data-acquisition and processing unit, operatively connected to said antenna, said data-acquisition and processing unit being configured to acquire a succession of images detected by said antenna during revolution of said antenna about said axis of rotation and said data-acquisition and processing unit being configured to perform differential interferometric calculations on at least two successive images of one or more targets located in a field of view of said system of one or more antennas in order to measure at least one component of displacement thereof, wherein said data-acquisition and processing unit is further configured to process said data detected along two distinct arcs of said circular path and said data-acquisition and processing unit is further configured to calculate interferograms between said at least two successive images acquired from said two distinct arcs of said circular path to obtain two components of displacements of one or more targets.

14. The radar according to claim 13, wherein said data-acquisition and processing unit is further configured to process said data detected along three distinct arcs of said circular path and said data-acquisition and processing unit is further configured to calculate said interferograms between successive images acquired from at least one of said arcs in order to obtain three components of said displacement in three directions of said target.

15. The radar according to claim 13, wherein said data-acquisition and processing unit is further configured to process said data of two arcs of said circular path with a different angle, equal to said angle formed by said axis and by a bisectrix of said arc considered, and said data-acquisition and processing unit is further configured to calculate said interferogram between said two images having said different angle in order to obtain a digital elevation map of said field of view.

16. The radar according to claim 13, wherein said data-acquisition and processing unit is configured to make a windowing of said arcs weighted on a segment subtended by one of said arcs.

17. The radar according to claim 13, wherein said system comprises a linear-polarization antenna.

18. The radar according to claim 13, wherein said system comprises a circular-polarization antenna.

* * * * *